United States Patent [19]

Stauers

[11] 4,231,099
[45] Oct. 28, 1980

[54] DIGITAL FUNCTION GENERATOR

[75] Inventor: Juris Stauers, Tempe, Ariz.

[73] Assignee: Motorola, Inc., Schaumburg, Ill.

[21] Appl. No.: 62,096

[22] Filed: Jul. 30, 1979

[51] Int. Cl.³ .............................................. G06F 1/02
[52] U.S. Cl. .................................................... 364/718
[58] Field of Search ............... 364/718, 720, 721, 722, 364/608; 328/142

[56] References Cited

U.S. PATENT DOCUMENTS

| 3,345,505 | 10/1967 | Schmid | 364/608 |
| 3,435,196 | 3/1969 | Schmid | 364/603 X |
| 3,513,301 | 5/1970 | Howe | 364/608 |
| 3,662,160 | 5/1972 | Hoppes | 364/718 |
| 3,674,999 | 7/1972 | Kelling | 364/718 |
| 3,689,754 | 9/1972 | LeFebre | 364/608 |
| 3,729,625 | 4/1973 | Inoue | 364/718 |
| 3,930,144 | 12/1975 | Tanaka | 364/718 |
| 4,064,423 | 12/1977 | Atkisson, Jr. | 364/718 |

Primary Examiner—David H. Malzahn
Attorney, Agent, or Firm—Eugene A. Parsons

[57] ABSTRACT

A counter is provided to count pulses applied thereto, with the output of the counter being applied to decode circuitry which operates selection or switching circuits to connect a plurality of pulse sources, each at a different repetition rate or frequency, to the counter in a predetermined sequence and at the occurrence of predetermined counts in said counter. The desired function of time being generated is represented by the magnitude of the digital binary number in the counter.

6 Claims, 4 Drawing Figures

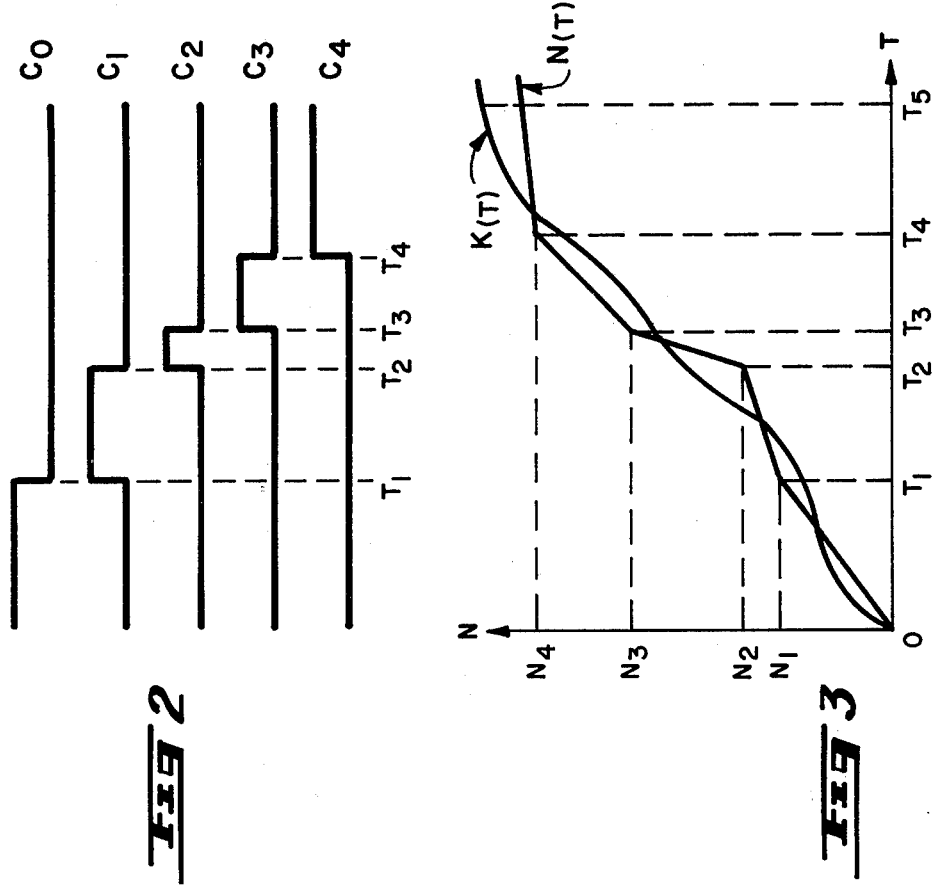
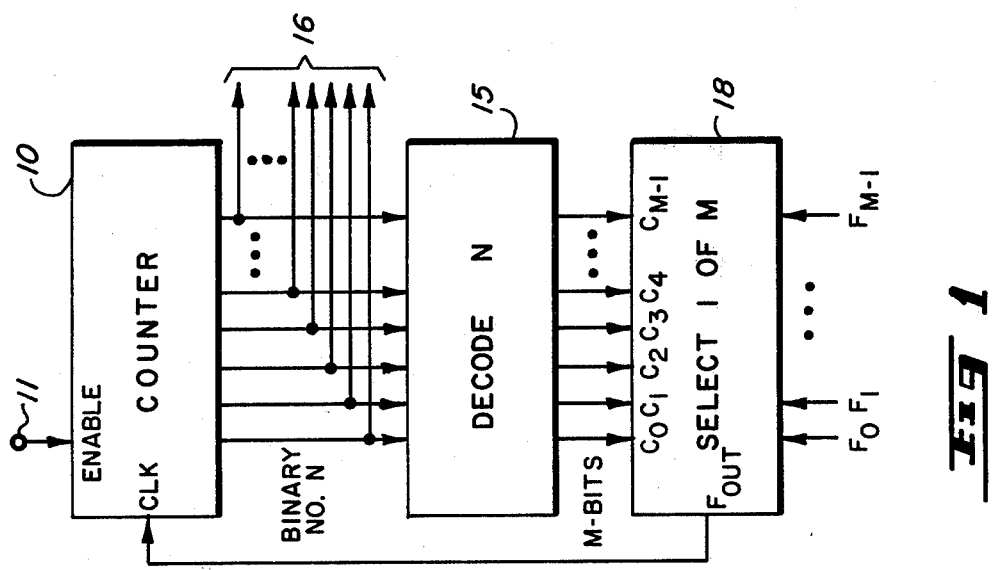

4,231,099

DIGITAL FUNCTION GENERATOR

BACKGROUND OF THE INVENTION

Circuits which generate, or synthesize, a specific function, such as a time dependent function, are well known in the art and are utilized in a great variety of applications. Function generators, and especially time dependent functions, are generally regarded by those skilled in the art as an analog circuit function. Another method to provide basically the same result is to generate the desired function in an analog manner and then make an analog to digital coversion. Either of these prior art methods of synthesizing a function are unsatisfactory in many applications because of the size and complexity, as well as the power requirements.

SUMMARY OF THE INVENTION

The present invention pertains to a digital function generator including a counter for counting input pulses with an output connected through decode circuitry to switches connected to couple a plurality of sources of pulses at different repetition rates in a predetermined sequence to the input of the counter. The time dependent function is available at the output of the counter and is represented by the magnitude of the digital binary number in the counter. The circuit is completely digital and can be easily incorporated into an integrated circuit.

It is an object of the present invention to provide a new and improved digital function generator.

It is a further object of the present invention to provide a new and improved digital function generator which is completely digital and integrated circuit compatible.

These and other objects of this invention will become apparent to those skilled in the art upon consideration of the accompanying specifications, claims and drawings.

BRIEF DESCRIPTION OF THE DRAWINGS

Referring to the drawings, wherein like characters indicate like parts throughout the figures:

FIG. 1 is a block diagram of a digital function generator embodying the present invention;

FIG. 2 is a timing diagram for the operation of the apparatus in FIG. 1;

FIG. 3 is a plot of an arbitrary function of time along with a synthesized approximation.

DESCRIPTION OF THE PREFERRED EMBODIMENT

Figure 4:
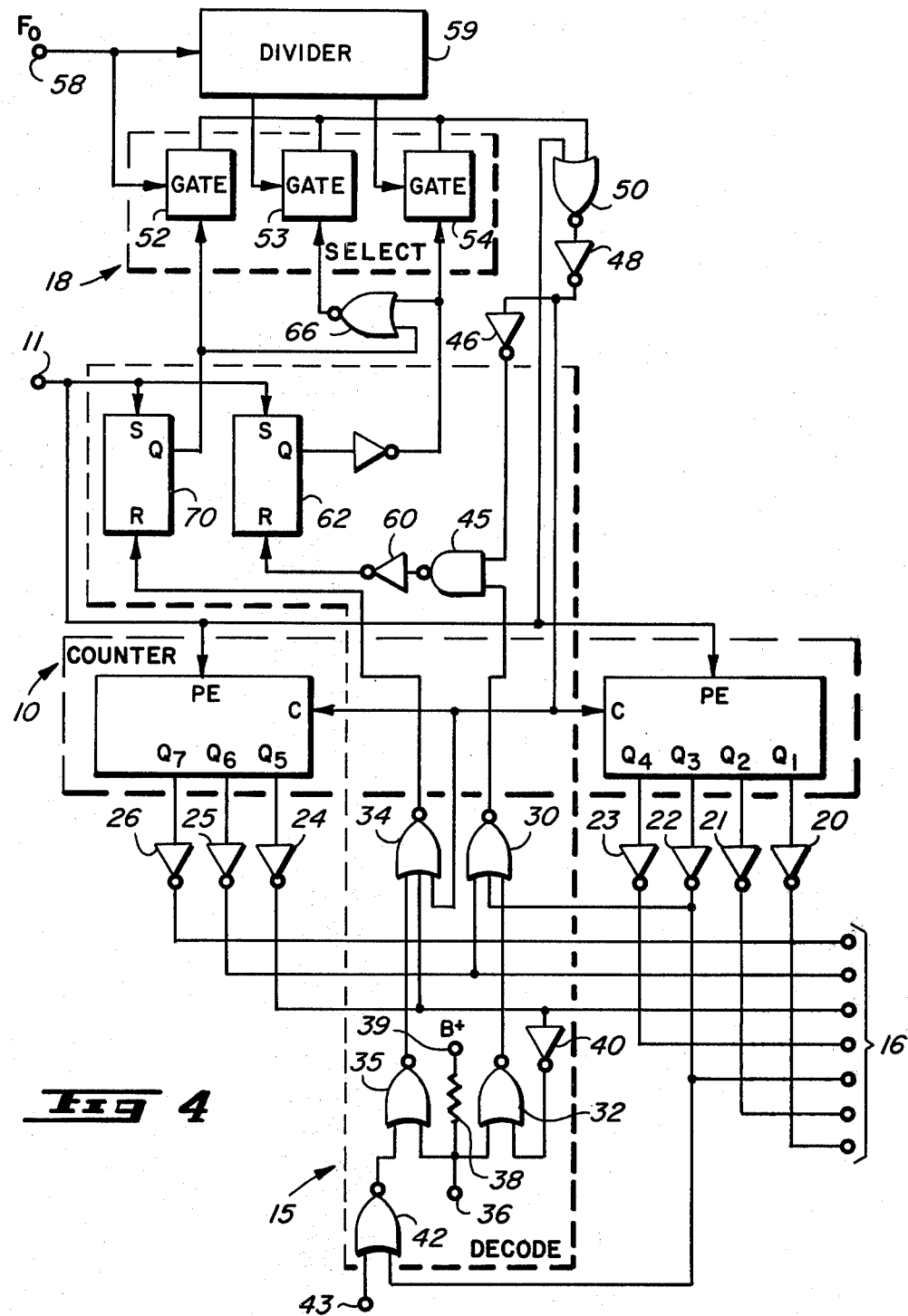
FIG. 4 is a detailed block diagram of a specific embodiment of the apparatus illustrated in FIG. 1.

Referring specifically to FIG. 1, a counter 10 has an enable input connected to a terminal 11 adapted to receive a pulse thereon for enabling, or starting, the counter 10. The counter 10 also has a clock input for receiving pulses to be counted and a plurality of outputs connected to a plurality of inputs to a decode circuit 15 and to external terminals 16. The decode circuit 15 has a plurality of outputs connected to a plurality of inputs in a select or switching circuit 18. The switching circuit 18 has a plurality of inputs connected to terminals adapted to have supplied thereto sources of pulses at different repetition rates, or frequencies. The switching circuit 18 also has an output which is connected to the clock input of the counter 10.

Prior to enabling the counter 10, the switching circuit 18 has a specific one of the input terminals, or pulse sources, connected to the output thereof. When the counter 10 is enabled by a pulse on the terminal 11, it begins to count the pulses at the clock input thereof from the switching circuit 18. When the counter 10 reaches a predetermined count the decode circuit 15 supplies a signal on one of its outputs to the associated input of the switching circuit 18, causing the switching circuit 18 to connect a different pulse source to the output thereof. The counter 10 counts the pulses from the second pulse source (at the different repetition rate) until the decode circuit 15 senses a second predetermined count, at which time a signal is applied to the switching circuit 18 to again change pulse sources. This process continues until the desire time dependent function is synthesized.

Referring to FIG. 2, a timing diagram is illustrated wherein the outputs of the decode circuit 15 are positioned in their proper time relationship. FIG. 3 illustrates an arbitrary function of time K(t) and a generated approximation N(t). The timing diagram of FIG. 2 and the functions of FIG. 3 are oriented to illustrate the time relationship therebetween. Referring to FIG. 1 in conjunction with FIGS. 2 and 3 and assuming that the decode circuit 15 and switching circuit 18 are constructed to operate in the sequence illustrated, the decode circuit 15 is initially supplying a signal to the switching circuit 18 on the input $C_0$ so that the pulse source $F_0$ is connected to the output thereof. When the counter 10 is enabled by the pulse on the terminal 11, the pulses of the pulse source $F_0$ are counted by the counter 10. When the decode circut 15 senses the predetermined count in the counter 10 a signal is supplied to the switching circuit 18 at the input $C_1$ to connect the pulse source $F_1$ to the output. As can be seen from FIGS. 2 and 3, the frequency or repetition rate of the pulse source $F_0$ and the predetermined count in the counter 10 are selected so that the synthesized curve from zero to the point $N_1$, $T_1$ approximates the desired function K(t) as closely as required. In FIG. 3, the synthesized curve N(t) is shown as a very rough approximation of the arbitrary curve K(t) to better illustrate the operation of the present circuit, and it will be understood by those skilled in the art that synthesized curves which are much closer approximations can be generated if desired. As each of the predetermined counts corresponding to the various times $T_1$, $T_2$, $T_3$, etc. is reached the frequency of the new pulse source and the next predetermined count are selected to provide the desired slope to the synthesized function. It can been seen that the time dependent function N(t) is represented by the magnitude of the digital binary number at the external terminals 16.

FIG. 4 illustrates a specific embodiment of the apparatus illustrated in FIG. 1. The counter 10, decode circuit 15 and switching circuit 18 are enclosed in dotted lines and generally indicated with the proper number in FIG. 4. The counter 10 will generally be incorporated into one or more integrated circuits and, therefore, is illustrated in simple block form in FIG. 4. In this embodiment the counter 10 has seven outputs designated $Q_1$ through $Q_7$, the clock input is designated C and the enable input is designated PE, as is common in the art. The seven outputs of the counter 10 are connected through inverters 20 through 26, respectively, to the external terminals 16. The output of the inverter 22 is also connected to one input of a NOR gate 30 forming a portion of the decode circuit 15. A second input of the NOR gate 30 is connected to the output of the inverter 25. A third input of the NOR gate 30 is connected to the output of a NOR gate 32. The output of the inverter 24 is connected to a first input of a NOR gate 34, a second input of which is connected to receive the clock pulses applied to the clock input of the counter 10. A third input of the NOR gate 34 is connected to the output of a NOR gate 35. The NOR gates 32 and 35 each have an input connected to an external terminal 36 and through a resistor 38 to a terminal 39 adapted to have a positive source of voltage connected thereto. A second input of the NOR gate 32 is connected through an inverter 40 to the output of the inverter 24. A second input of the NOR gate 35 is connected to the output of a NOR gate 42, one input of which is connected to an external terminal 43 and a second input of which is connected to the output of the inverter 22. The NOR gates 32, 35 and 42 and the external terminals 36 and 43 form a means for altering the predetermined counts to which the decode circuit 15 reacts and, therefore, the synthesized function produced, as will be explained presently.

The output of the NOR gate 30 is connected to one input of a NAND gate 45. A second input of the NAND gate 45 is connected through an inverter 46 to the output of an inverter 48, which is also the source of clock pulses applied to the clock input of the counter 10. The inverter 48 is connected to the output of a NOR gate 50, one input of which is connected to the enable input of the counter 10 and the external terminal 11 and the other input of which is connected to the parallel outputs of three transmission gates 52, 53 and 54, which form the switching circuit 18. An input of the gate 52 is connected to an external terminal 58, adapted to have a source of pulses at a frequency $F_0$ supplied thereto. The external terminal 58 is also connected to the input of a divider circuit 59 having two outputs connected to the inputs of the gates 53 and 54. Since the divider 59 is well known in the art and since the frequency supplied to the various transmission gates in the switching circuit 18 will depend upon the specific function desired, the divider circuit 59 is not illustrated in detail.

The output of the NAND gate 45 is connected through an inverter 60 to the reset input, R, of a bistable flip-flop 62. The set input, S, is connected to the external terminal 11. The Q output of the flip-flop 62 is connected through an inverter 65 to the enable or activating input of the transmission gate 54 and to one input of a NOR gate 66. The output of the NOR gate 34 is connected to the reset input of a second bistable flip-flop 70, the set input of which is connected to the external terminal 11 and the Q output of which is connected to the enable input of the transmission gate 52 and a second input of the NOR gate 66. The output of the NOR gate 66 is connected to an enable input of the transmission gate 53.

The operation of the circuitry illustrated in FIG. 4 is as follows. When an initiating pulse is applied to the external terminal 11 the bistable flip-flops 62 and 70 are set so that the outputs thereof are high. The high output from the flip-flop 70 enables the transmission gate 52 and allows the pulses applied to the external terminal 58 to pass therethrough. The high at the output of the flip-flop 70 is also applied to the NOR gate 66 which causes the output thereof to be low and the transmission gate 53 is deactivated. Also, the high at the output of the flip-flop 62 is inverted by the inverter 65 and applies a low signal to the transmission gate 54 which deactivates it. Thus, the pulses at the frequency $F_0$ are supplied through the NOR gate 50 and the inverter 48 to the clock input of the counter 10. The NOR gate 50 and inverter 48 are included in the circuit simply to ensure that the counter 10 starts counting pulses after the initiate pulse is removed from the external terminal 11. Thus, upon initiating the circuitry by a pulse on the terminal 11 the counter 10 begins to count pulses at the frequency $F_0$.

Normally, the external terminals 36 and 43 will be open or unconnected so that a high signal is applied to the NOR gates 32 and 35 from the terminal 39. This effectively takes the circuitry out of the apparatus since the outputs from the NOR gates 32 and 35 will always be low. Thus, for the present time these circuits can be ignored. When the count in the counter 10 is sufficient to produce an output on $Q_5$, the high signal is inverted in inverter 24 and supplied as a low signal to the NOR gate 34. When the clock pulses at the output of the inverter 48 are low the NOR gate 34 will produce a high output which resets the flip-flop 70. With the flip-flop 70 reset the output thereof goes low so that the transmission gate 52 is deactivated. Simultaneously the low output of the flip-flop 70 is supplied to the NOR gate 66 which has a low signal at its other input and, therefore, the output thereof goes high to enable the transmission gate 53. The frequency $F_1$ from the divider 59 is connected through the transmission gate 53, the NOR gate 50 and the inverter 48 to the clock input of the counter 10. Thus, the counter 10 begins to count at a rate equal to the repetition rate or frequency $F_1$ of the second pulse source.

When the count in the counter 10 becomes sufficient to produce an output at $Q_6$ and $Q_3$ the NOR gate 30 produces a high output which, when coincident with the space between clock pulses (as determined by the inverter 46), produces a low output from the NAND gate 45 which is inverted by the inverter 60 to reset the flip-flop 62. Resetting the flip-flop 62 produces a low at the output thereof which is inverted to supply a high signal to the NOR gate 66 and the transmission gate 54. The high signal at the input of the NOR gate 66 deactivates the gate 53 and the high signal at the transmission gate 54 activates the gate to allow the pulses at the frequency $F_2$ to pass therethrough. Thus, the counter 10 will begin to count at the rate $F_2$ of the third source of pulses.

In this specific embodiment only three different pulse sources are illustrated for purposes of example and it will be understood by those skilled in the art that any additional number of pulse sources and the appropriate decode circuitry to connect these pulse sources at predetermined times and in the correct sequence can be devised by utilizing this teaching. Apparatus for altering the predetermined counts externally is also disclosed herein. By supplying an appropriate negative signal to the external terminal 36 the positive voltage applied to the external terminal 39 can be overcome so that low signals are effectively applied to the inputs of the NOR gates 32 and 35. Under these circumstances, a low signal at the external terminal 43 also prepares the NOR gate 42 for operation. Now the count in the counter 10 must be such as to produce a high at the output $Q_3$ and $Q_5$ to operate the NOR gate 34 and terminate the first portion of the synthesized function. Also, the count in the counter 10 must be such as to produce an output at the $Q_3$, $Q_5$ and $Q_6$ terminals to operate the NOR gate 30 and terminate the second portion of the synthesized portion. Thus, the circuitry including the external terminals 36 and 43 and the NOR gates 32, 35 and 42 operate to allow an external change in the synthesized function. It will of course be understood by those skilled in the art that the specific change is only disclosed as an example and many other alterations in the synthesized function may be devised by those skilled in the art.

Thus, an improved digital function generator is disclosed which is capable of synthesizing substantially any desired time dependent function and which is completely digital. Since all of the circuitry is digital the apparatus can be easily incorporated into integrated circuitry and can, therefore, be manufactured very small and inexpensively and will utilize a minimum of power. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A digital function generator comprising:
   (a) a counter having an input for receiving pulses to be counted and a plurality of outputs;
   (b) switching means having a plurality of pulse inputs connected to receive pulses thereon with the pulses having a different repetition rate on each of the different inputs, an output, and a plurality of selection inputs for coupling a selected pulse input to the output in response to a signal applied to a specific selection input, the output being further connected to the input of said counter; and
   (c) decode means having a plurality of inputs connected to the plurality of outputs of said counter and a plurality of outputs connected to the plurality of selection inputs of said switching means for providing signals on the selection inputs in a predetermined sequence and at the occurrence of predetermined counts in said counter.

2. A digital function generator as claimed in claim 1 wherein the switching means includes a plurality of switches, each connecting a specific pulse input to the output in response to a signal on a specific selection input.

3. A digital function generator as claimed in claim 1 wherein the decode means includes means for altering the predetermined counts.

4. A digital function generator as claimed in claim 1 wherein the decode means includes means for altering the predetermined counts through an external input.

5. A digital function generator as claimed in claim 1 wherein the different repetition rates of the pulses and the predetermined counts are preselected to snythesize a desired function of time.

6. A digital function generator as claimed in claim 5 wherein the function of time is available at the outputs of the counter and is represented by the magnitude of the digital binary number in the counter.

* * * * *